(12) United States Patent
Southwell et al.

(10) Patent No.: US 12,475,481 B2
(45) Date of Patent: Nov. 18, 2025

(54) COUPON VALIDATION AND FRAUD MITIGATION

(71) Applicant: Catalina Marketing Corporation, St. Petersburg, FL (US)

(72) Inventors: Tiffany Southwell, St. Petersburg, FL (US); Zubin Singh, St. Petersburg, FL (US); Ryan Monahan, St. Petersburg, FL (US); Kirk Dikun, Tampa, FL (US); Tony Mou, St. Petersburg, FL (US); Todd Schramek, St. Petersburg, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

(21) Appl. No.: 17/781,683

(22) PCT Filed: Apr. 30, 2020

(86) PCT No.: PCT/US2020/030602
§ 371 (c)(1),
(2) Date: Jun. 1, 2022

(87) PCT Pub. No.: WO2020/223428
PCT Pub. Date: Nov. 5, 2020

(65) Prior Publication Data
US 2023/0005007 A1  Jan. 5, 2023

Related U.S. Application Data

(60) Provisional application No. 62/841,101, filed on Apr. 30, 2019.

(51) Int. Cl.
*G06Q 30/02* (2023.01)
*G06Q 20/38* (2012.01)
(Continued)

(52) U.S. Cl.
CPC ....... *G06Q 30/0225* (2013.01); *G06Q 20/387* (2013.01); *G06Q 30/0185* (2013.01)

(58) Field of Classification Search
CPC ............ G06Q 30/0225; G06Q 20/387; G06Q 30/0185; G06Q 30/0207
See application file for complete search history.

(56) References Cited

U.S. PATENT DOCUMENTS

| | | | |
|---|---|---|---|
| 11,263,656 B1 * | 3/2022 | Weiss | H04L 9/30 |
| 2011/0251879 A1 * | 10/2011 | Lambert | G06Q 30/0224 705/14.1 |

(Continued)

OTHER PUBLICATIONS

"Why The Bitcoin Blockchain Could Make Gift Cards, A Consumer Favorite, Even More Beloved" (Shin, Laura; published Jun. 17, 2015 at https://www.forbes.com/sites/laurashin/2015/06/17/why-the-bitcoin-blockchain-could-make-gift-cards-a-consumer-favorite-even-more-beloved/?sh=6f5c765c1b57) (Year: 2015).*

(Continued)

Primary Examiner — James M Detweiler
(74) Attorney, Agent, or Firm — McDermott Will & Schulte LLP

(57) ABSTRACT

A method for preventing fraud is provided that includes receiving metadata from a manufacturer for an incentive associated with a product, the metadata including a product identifier and a redemption rule. The method includes requesting a host to create a record in a ledger for the incentive using the metadata, providing the incentive to a consumer via a mobile device, assigning a public address to the incentive, receiving from the host a first private key associated with the public address in the record, providing the first private key to the consumer, and receiving a second private key indicative of a redemption of the incentive at a retailer. The method includes validating redemption of the incentive and recording the redemption of the incentive at a (Continued)

retailer in the ledger record when the redemption of the incentive is validated. A system to perform the above method is also provided.

14 Claims, 9 Drawing Sheets

(51) Int. Cl.
  *G06Q 30/018* (2023.01)
  *G06Q 30/0207* (2023.01)

(56) References Cited

U.S. PATENT DOCUMENTS

| | | | |
|---|---|---|---|
| 2013/0024267 A1* | 1/2013 | Libenson | G06Q 30/02 705/14.38 |
| 2014/0214514 A1 | 7/2014 | Rector et al. | |
| 2017/0286991 A1* | 10/2017 | Chakrobartty | G06Q 20/20 |
| 2017/0364936 A1* | 12/2017 | Balfour | G06Q 20/204 |
| 2018/0150865 A1* | 5/2018 | Arora | G06Q 30/0225 |
| 2018/0253745 A1* | 9/2018 | Webster | G06Q 20/36 |
| 2019/0012695 A1* | 1/2019 | Bishnoi | G06Q 20/223 |
| 2019/0236560 A1 | 8/2019 | Song et al. | |
| 2020/0302468 A1* | 9/2020 | Karuppan | H04L 63/12 |
| 2023/0135248 A1* | 5/2023 | Westhead | G06Q 30/0225 705/14.26 |

OTHER PUBLICATIONS

Extended European Search Report issued in the European application No. 20798856.9 dated Dec. 6, 2022 (8 bages).
International Search Report issued in corresponding International Patent Application No. PCT/US2020/030602, dated Aug. 14, 2020 (4 pages).

* cited by examiner

COUPON VALIDATION AND FRAUD MITIGATION

CROSS-REFERENCE TO RELATED APPLICATIONS

The present disclosure is the U.S. National Phase under 35 U.S.C. § 371 of International Patent Application No. PCT/US2020/030602, filed on Apr. 30, 2020, which in turn claims priority under the rules and regulations of the PCT, to U.S. Provisional Patent Application No. 62/841,101, entitled "COUPON VALIDATION AND FRAUD MITIGATION," to Tiffany SOUTHWELL, et al. filed on Apr. 30, 2019, the contents of which are herein incorporated by reference in their entirety, for all purposes.

BACKGROUND

Field

The present disclosure generally relates to systems and procedures for coupon validation and fraud mitigation. More specifically, embodiments as disclosed herein relate to applying blockchain technology to validate, manage, and record consumer offers, for fraud mitigation.

BRIEF DESCRIPTION OF THE FIGURES

In the figures, elements and features having the same or similar reference numerals share the same or similar description or functionality.

SUMMARY

Figure 1:
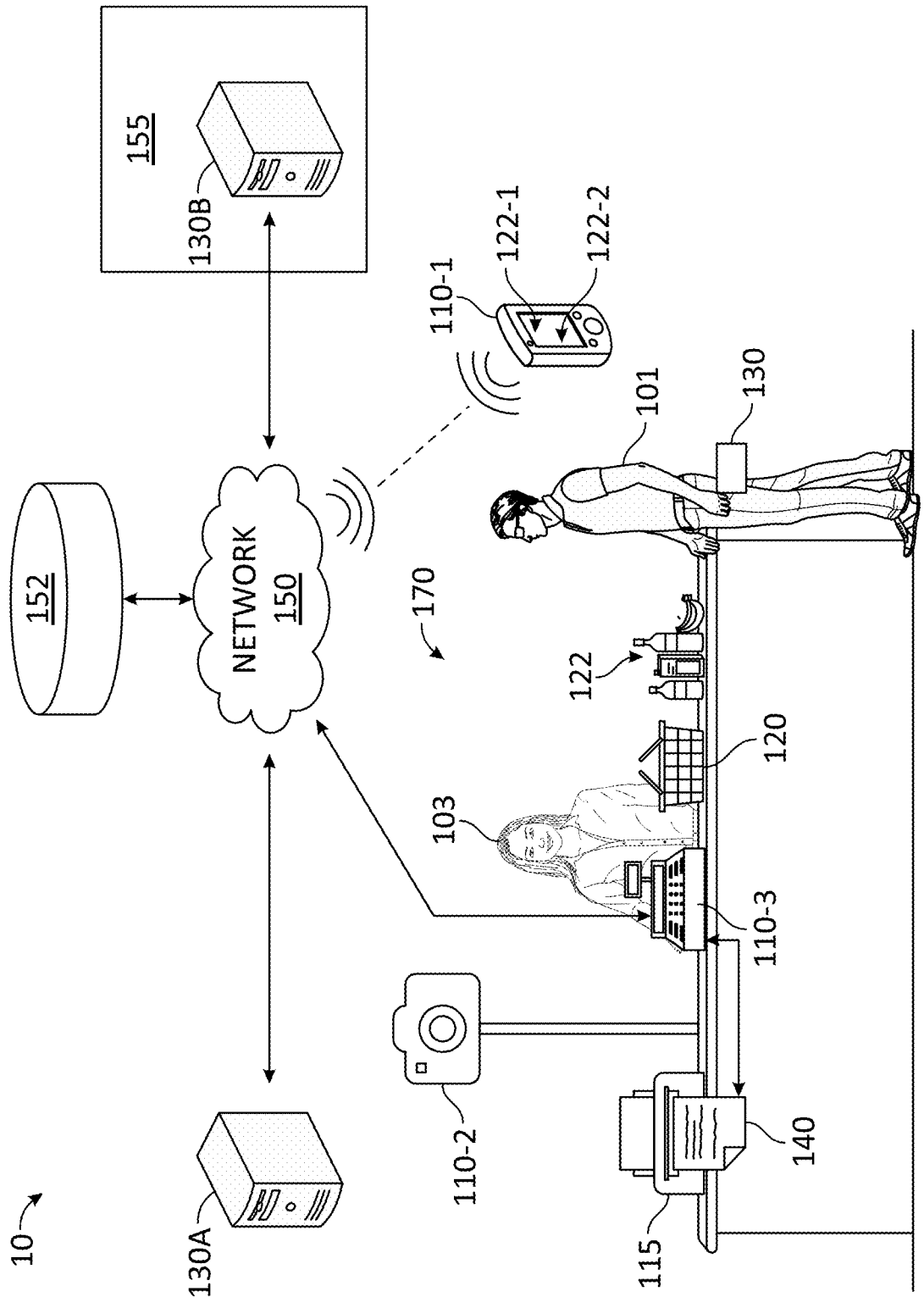
FIG. 1 illustrates a system configured for providing coupons that a consumer can redeem and account for through a network, at a reduced fraud likelihood, according to some embodiments.

A computer-implemented method as disclosed herein includes receiving incentive metadata from a brand manufacturer for an incentive associated with a selected product, the incentive metadata including a product identifier and a redemption rule. The computer-implemented method also includes requesting a server host to create a distributed ledger record for the incentive using the incentive metadata, providing the incentive to a consumer via a mobile device, the incentive including the incentive metadata, and assigning a public address to the incentive, and receiving from the server host a first private key associated with a hash of the public address in the distributed ledger record. The computer-implemented method also includes providing the first private key to the consumer when the consumer has selected the incentive using the mobile device, receiving a second private key indicative of a redemption of the incentive at a retailer, accessing the distributed ledger record using the second private key to validate the redemption of the incentive and recording the redemption of the incentive at a retailer in the distributed ledger record when the redemption of the incentive is validated.

A system as disclosed herein includes one or more processors and a memory storing instructions. When the one or more processors execute the instructions, they cause the system to: receive incentive metadata from a brand manufacturer for an incentive associated with a selected product, the incentive metadata including a product identifier and a redemption rule. When the one or more processors execute the instructions, they also cause the system to request, to a server host, to create a distributed ledger record for the incentive using the incentive metadata, to provide the incentive to a consumer via a mobile device, the incentive including the incentive metadata, to assign a public address to the incentive, and receiving from the server host a first private key associated with a hash of the public address in the distributed ledger record, and to provide the first private key to the consumer when the consumer has selected the incentive using the mobile device. When the one or more processors execute the instructions, they also cause the system to receive a second private key indicative of a redemption of the incentive at a retailer, to access the blockchain record using the second private key to validate the redemption of the incentive, and to record the redemption of the incentive at a retailer in the blockchain record when the redemption of the incentive is validated.

A computer-implemented method as disclosed herein includes providing an incentive metadata according to a brand and a content provider, including a barcode and receiving a request for incentive validation from a point of sale in a first retailer when the barcode are detected, the request including an offer code, a serialized barcode, and a product code scanned at the point of sale. The computer-implemented method also includes validating an incentive identified in the incentive metadata, based on an incentive history, providing a validation message to the first retailer at the point of sale, providing granular redemption data to the brand when a discount has been applied to a transaction, and storing a transaction data in a database.

A computer-implemented method as disclosed herein includes providing a certificate metadata according to a source and a content provider, including a bar code, and receiving a request for certificate authentication from a point of operation in a first location when the bar code are detected, the request including an offer code, a serialized bar code, and a product code scanned at the point of operation. The computer-implemented method also includes authenticating a certificate identified in the certificate metadata, based on a log history, providing an authentication message to the first location at the point of operation, providing granular redemption data to the source when a discount has been applied to an operation, and storing an operation data in a database.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

In consumer networks and the product advertising industry, fraud and error in coupon redemption costs hundreds of millions of dollars, annually. In addition to the direct economic loss, there is the negative environment generated by the divided liabilities associated with fraud. Particularly, the business relation between brand manufacturers and retailers become fraught and jaded, e.g., when a promotional campaign for a selected product becomes mired in fraudulent activity and invalidity claims. The advent and prevalence of mobile networks enabling electronic dissemination of offers, advertisements, and financial data, has only exacerbated the problem.

A system as provided herein is configured to solve the above problem by applying the technical solution offered by a centralized and decentralized network system that handles the brand manufacturer end and the retailer end of the coupon transaction (e.g., from offer to redemption of the coupon). Additionally, some embodiments include the added technical feature of a blockchain record representing each stage of the coupon transaction. The blockchain record may be generated by a blockchain host in a blockchain network, upon request by a server in the centralized and decentralized network system. It is desirable to maintain a low latency for recording the coupon transaction to the blockchain record. Accordingly, some embodiments include a robust and efficient communication with the blockchain host to avoid redemption issues. Embodiments as disclosed herein avoid the common problem of delivering a coupon to the user at the checkout lane when the coupon is not ready to be validated by a point of sale (POS) device.

FIG. 1 illustrates a system 10 configured for providing coupons 140 that a consumer 101 can redeem and account for through a network 150, at a reduced fraud likelihood. More generally, a coupon 140 consistent with embodiments disclosed herein may be any promotion (e.g., coupons, vouchers rebates, and the like) associated with a selected product 122 (e.g., a branded product). Without limitation, network 150 may include mobile devices 110-1, household computers, television sets, and any other sensors and devices that connect to the Internet and remote servers such as a server 130A, a server 130B (hereinafter, collectively referred to as "servers 130"), and a database 152, communicatively coupled to one another, wirelessly (e.g., cellular network, Wi-Fi, Bluetooth, and the like) or through a wired channel (e.g., telephone line, Ethernet, and the like). The devices in servers 130, and database 152, may each include at least a memory circuit and one or more processor circuits. The memory circuits may include instructions which, when executed by the processor circuits, cause the devices, servers 130, and database 152 to perform at least some steps in methods as disclosed herein.

Server 130A may include a publisher. Accordingly, server 130A may be a publisher server that collaborates with a consumer packaged goods (CPG) manufacturer to promote and advertise products 122 through in-store printers 115 and a load-to-card network. Accordingly, server 130A may serialize, register, and provide CPG coupons 140 to a blockchain record in a blockchain network 155. In some embodiments, server 130A may also distribute coupons 140 to consumer 101 through network 150 (e.g., via consumer mobile device 110-1), based on a loyalty card 130 certifying that consumer 101 is member of a network service provided by server 130A.

In some embodiments, server 130B may be part of blockchain network 155. In some embodiments, server 130B may create and host a blockchain record for each coupon 140. Blockchain network 155 may be hosted by one or more CPG content distributors that work with CPG Brands to issue and distribute coupons 140 through promotional campaigns and the like. Accordingly, it may be desirable for one or more CPG content distributors to host blockchain network 155, thus setting an industry standard.

The blockchain record may include a sequence of blocks corresponding to different steps in the coupon history: offer, validation, and redemption by a consumer. The blocks for the transaction are concatenated in a cryptographic linkage. More generally, servers 130 may provide any network service to consumer 101 including retail shopping, consumer brands, services, information, entertainment, travel, business, and the like. Consumer 101 may access servers 130, and any other network server via internet enabled devices such as mobile device 110-1.

Loyalty card 130 may include an identification (ID), with membership ascribed to a network service hosted by server 130A. With loyalty card 130, consumer 101 may access the loyalty services provided through network 150, remotely, with mobile device 110-1. Mobile device 110-1 may include personal identifiable information (PII) such as an advertising digital identifier, an IP address, or any other ID naming scheme that is PII-safe, following the guidelines set forth by the Interactive Advertising Bureau (iAB). In some embodiments, the consumer may be located within a retail store (e.g., in a particular section of the store) or even at a point of sale (POS) 170 of the retail store.

Mobile device 110-1 may include one or more application programming interface (API) 122-1, or software development kits (SDKs) 122-2 (hereinafter, collectively referred to as "applications 122"), hosted by servers 130. Without limitation, multiple servers 130 may host multiple applications 122 installed in the devices, providing different network services to the user. In some embodiments, at least one of servers 130 may host a coupon 140 for consumer 101, valid in the purchase of one of products 122 at POS 170. The coupon may be a barcode or a QR code displayed on the consumer mobile device, that can be scanned by an ID device 110-2 or a POS device 110-3, by a cashier 103 or automatically, when the selected product is included in a shopping basket 120. ID device 110-2 may include a video camera or a picture grabbing device configured to identify consumer 101 either by mobile device 110-1, loyalty card 130, or an image of the consumer's face or any other bio-identifier (e.g., fingerprint, pupil pattern, and the like). When the coupon redemption is validated by either server 130A or server 130B, the discount is applied to the transaction. Hereinafter, mobile phone 110-1, ID device 110-2, and POS device 110-3 will be collectively referred to as "client devices 110."

Database 152 may include one or more databases, accessible to either of servers 130A and 130B through network 150. In some embodiments, each one of servers 130A and 130B may include their own database, coupled to network 150 through a firewall configured to provide privacy and security to the information.

Figure 2:
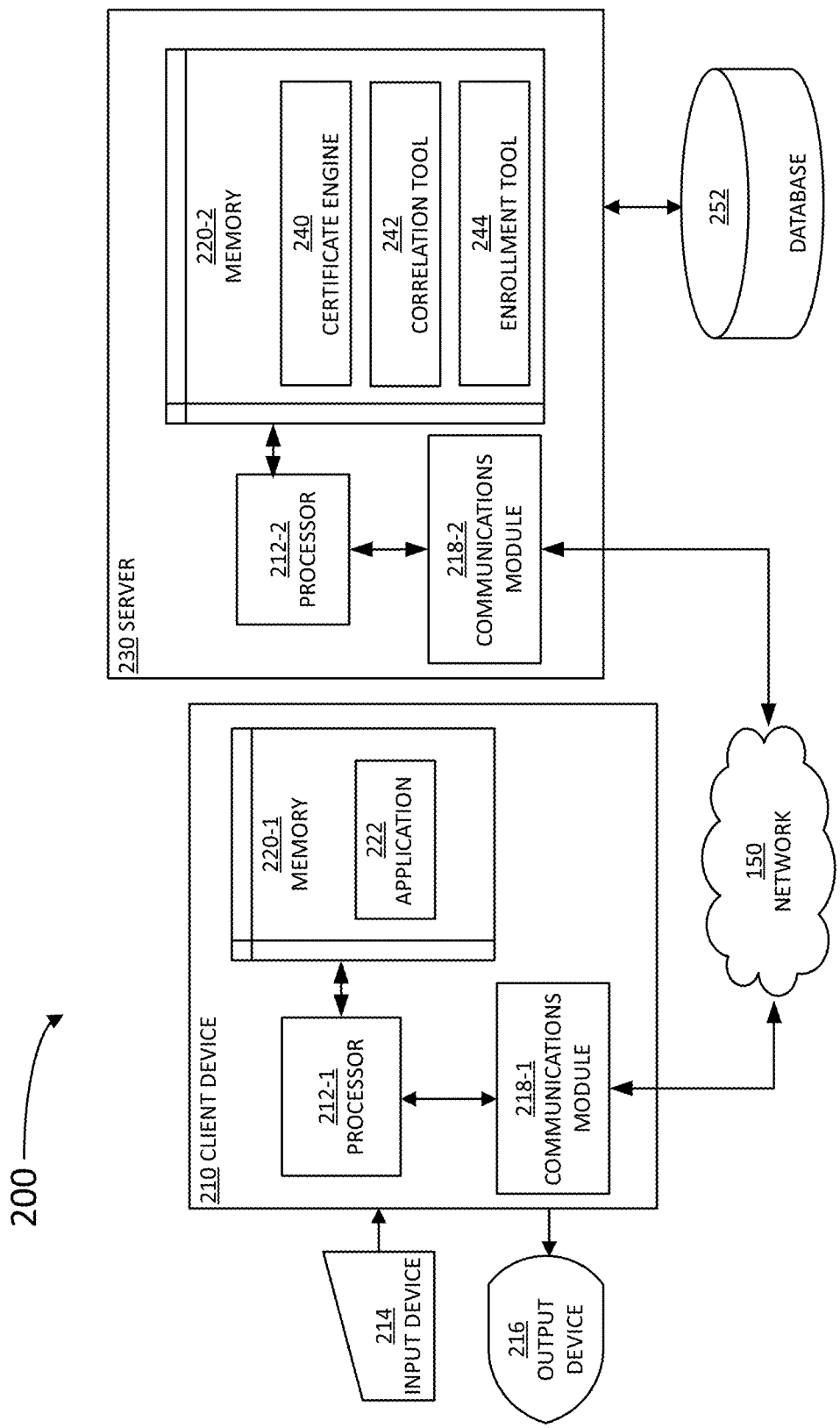
FIG. 2 illustrates in more detail features and components of some of the devices in the system of FIG. 1, according to some embodiments.

FIG. 2 illustrates in more detail features and components of some of the devices in system 10, according to some embodiments. A client device 210 is communicatively coupled with a server 230 via network 150. Server 230 may also have access to a database 252 via network 150. In some embodiments, database 252 may be part of server 230. While architecture 200 only shows one server 230 and one client device 210, in some embodiments, multiple client devices may couple to multiple servers through network 150, of which client device 210 and server 230 are but one example. Client device 210 may include a personal computer, a portable or mobile computer (e.g., a laptop), a cell phone, a smartphone, a palm device, or any other device such as a printer, a smart printer, or a display.

Client device 210 and server 230 may include a processor 212-1 and a memory 220-1 (client device 210), a processor 212-2, and a memory 220-2 (server 230), hereinafter, collectively referred to as "processors 212" and "memories 220." A communications module 218-1 in client device 210 and a communications module 218-2 in server 230 enable interfacing each of these devices with network 150 (hereinafter, collectively referred to as "communications modules 218"). Communications modules 218 may include radio frequency circuitry and antennas configured to transmit and receive radio frequency signals such as Bluetooth, near field coupling, Wi-Fi, and the like. In that regard, communications modules 218 may enable one or more client devices as client device 210 and one or more servers as server 230 to communicate to one another directly, separately from network 150.

Memory 220-1 may include an application 222 (e.g., API 122-1, SDK 122-2) including instructions which, when executed by processor 212-1, cause client device 210 to execute at least partially some of the methods disclosed herein. In some embodiments, application 222 may be installed and hosted by server 230 upon a consumer authorization. Likewise, memory 220-2 may include a certificate engine 240 having instructions which, when executed by processor 212-2, cause server 230 to execute at least partially some of the methods consistent with the present disclosure.

Certificate engine 240 performs identity correlation analysis and authenticates, validates, and modifies offers to consumers in view of business rules, advertisement rules, and consumer profiles. In some embodiments, certificate engine 240 includes a correlation tool 242. In some embodiments, correlation tool 242 includes analytics algorithms based on business rules. In some embodiments, correlation tool 242 includes algorithms based on consumer identification, and handles certificate errors, frauds, and other inconsistencies. In some embodiments, an enrollment tool 244 includes identity resolution algorithms, and is configured to perform identity mapping and onboarding of new subscribers.

Database 252 may include purchasing information for the consumer operating client device 210. Database 252 may also include a correlation table associating a device identification code for client device 210 with a consumer purchasing history. Database 252 may also include information from retail stores, and brand manufacture products.

Client device 210 may also include or be communicatively coupled with one or more peripheral devices such as an input device 214 and an output device 216.

Figure 3:
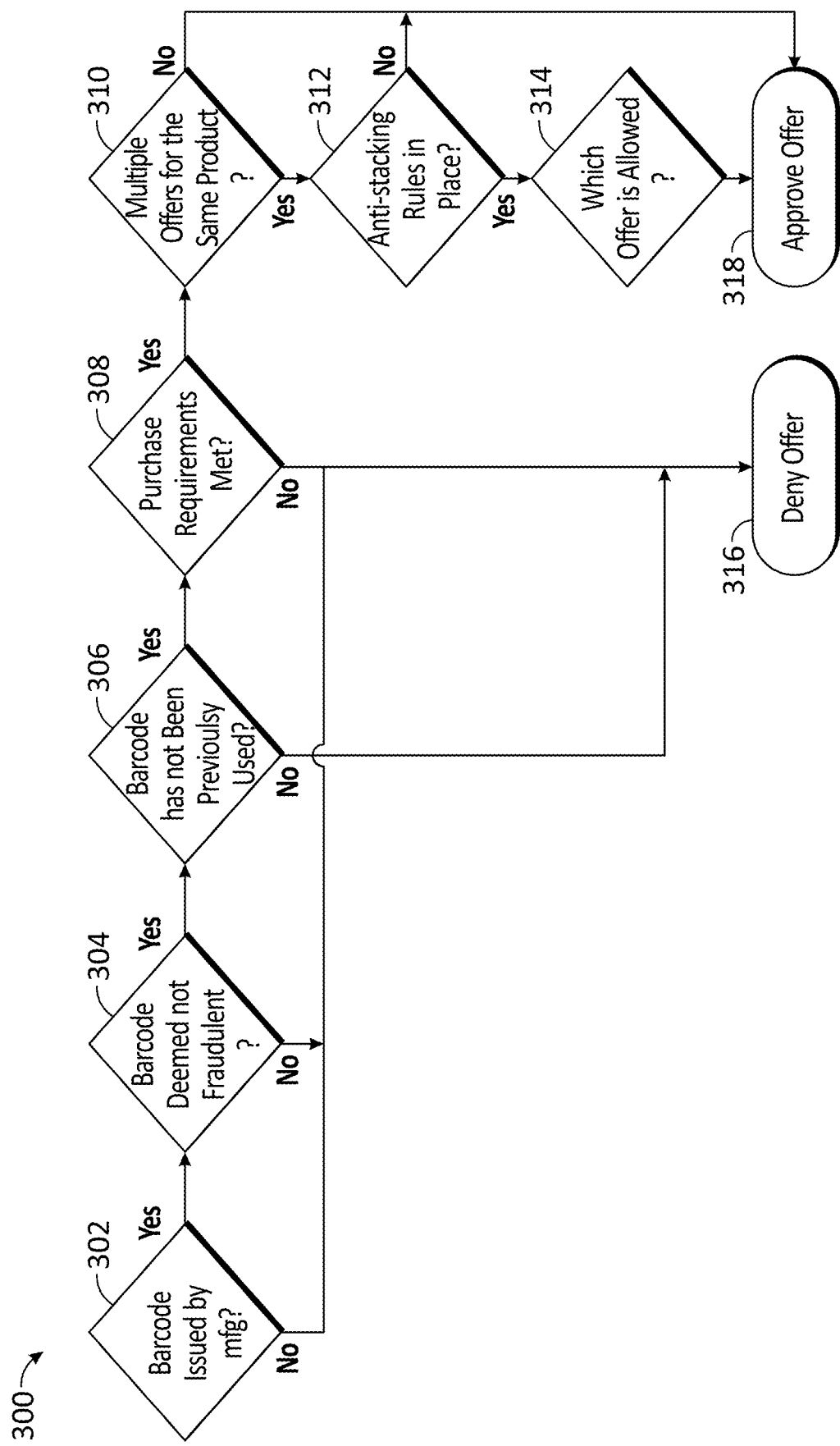
FIG. 3 illustrates a block diagram including devices and steps preformed in a method for offering, validating, and redeeming a coupon, according to some embodiments.

FIG. 3 illustrates a block diagram 300 including devices and steps preformed in a method for offering, validating, and redeeming a coupon, according to some embodiments. The time sequence of the steps in diagram 300 progresses from top (earlier) to bottom (later). In general, events in diagram 300 may occur at an arbitrary time, simultaneously or overlapping, notwithstanding the specific embodiment illustrated in the figure.

The manufacturer (e.g., server A) creates and submits a coupon (offer) to the consumer. The coupon may be a promotion associated with a selected product (e.g., a branded product) such as a voucher, or any other value added certificate. For example, the promotion may include a voucher for the purchase of the product (e.g., a $5.00 voucher), or a rebate (e.g., save $1.00!). The manufacturer then registers the coupon transaction with a blockchain host (e.g., server B) that opens a block thread for the offer. The coupon is thus assigned an ID, which is stored in a blockchain database together with the value, the product item associated with it, and an ID of the consumer to which the offer was made (and who presumably has accepted the offer).

At a later time, the consumer decides to use the coupon and presents the coupon at a POS of a retail store. The consumer may scan a barcode or a QR code with the coupon or offer, at the POS. The POS transmits the offer to the blockchain host where the coupon is clipped to confirm authenticity, first time use, the consumer ID, product quantity, terms and conditions of the offer, and other details included in the original coupon offer, according to the blockchain. The blockchain host validates the coupon redemption (barcode issued by manufacturer? Step 302) and ensures that the barcode is not deemed fraudulent (step 304), the barcode has not been previously used (step 306), and that the purchase requirements have been met (e.g., payment complete, step 308). Then, the blockchain host communicates a validation message to the POS. For any failure associated with the above, the consumer is denied the promotion discount (step 316). In the case of completing all steps until the purchase requirements, the blockchain host also needs to validate that there aren't multiple offers for the same product (step 310), and that multiple offers for the same product cannot be combined and used simultaneously. The decision of which offer to allow is determined by the blockchain host based on the promotion metadata and anti-stacking rules (step 312). The system verifies which offers are allowed (step 314). In the case where all previous gating rules and restrictions have been satisfied, the POS sends a message to the blockchain sever that the coupon, certificate, or voucher can be redeemed (step 318). The blockchain host may then complete the blockchain sequence and store it a database, or delete it from memory. In some embodiments, the blockchain host may associate a "redeemed" label to the record for the coupon, certificate, voucher, or confirmation, and store the record in the database (step 318).

Figure 4:
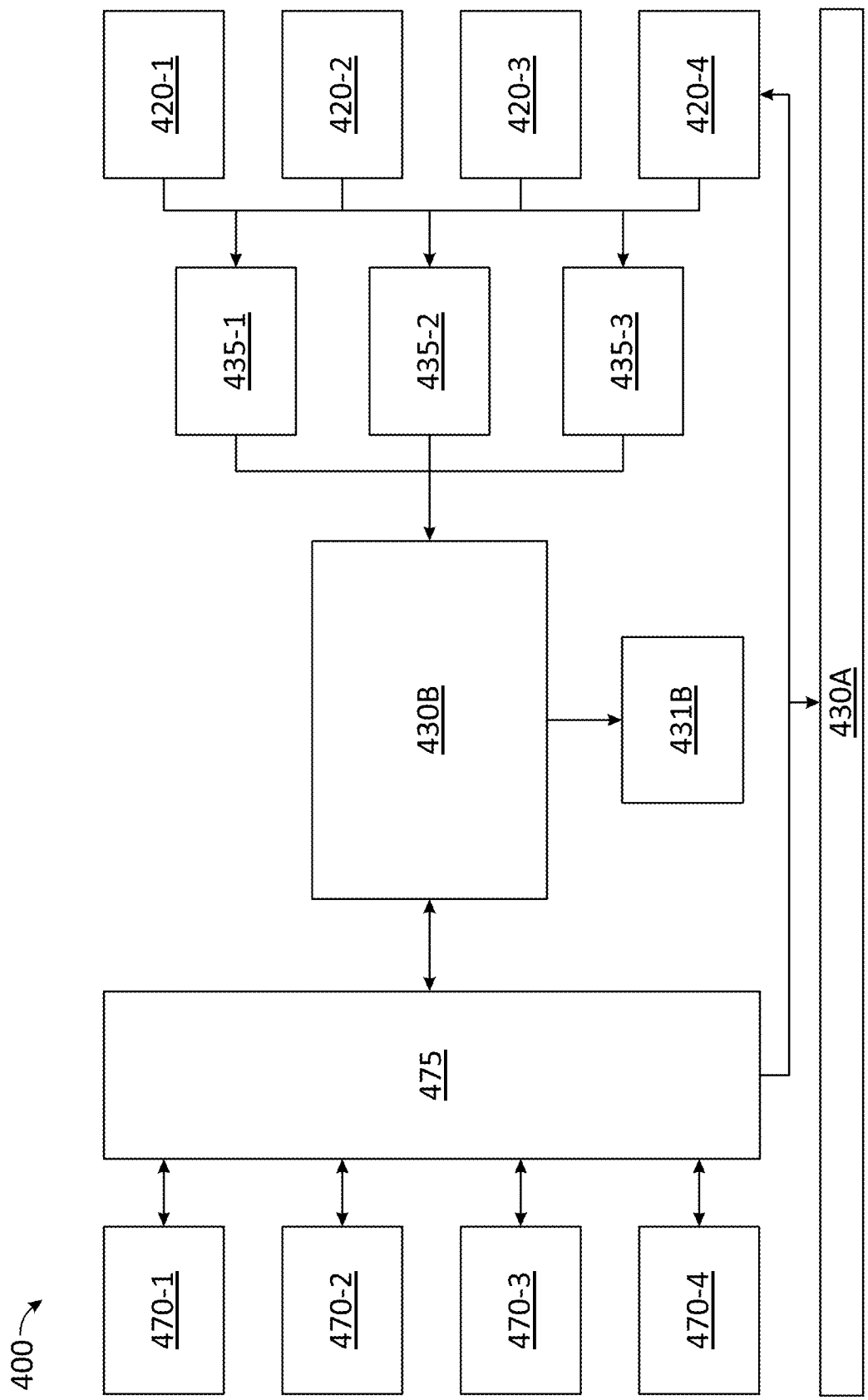
FIG. 4 illustrates a block diagram including content providers, retail integrators, and a coupon server, according to some embodiments.

FIG. 4 illustrates a block diagram 400 including content providers 435-1, 435-2, and 435-3 (hereinafter, collectively referred to as "content providers 435"), retailers 470-1, 470-2, 470-3, and 470-4 (hereinafter, collectively referred to as "retailers 470"), a retail integrator 475, and a coupon server 430B, according to some embodiments. In some embodiments, content providers 435 and retail integrator 475 are servers coupled to a network (e.g., servers 130). Content providers 435 create a coupon offer in response to a request by one of multiple brand manufacturers 420-1, 420-2, 420-3, and 420-4, hereinafter, collectively referred to as "brand manufacturers 420," e.g., for a product campaign. More generally, the coupon may be any promotion associated to a branded product, such as a voucher, or any other value added certificate. Content providers 435 publish coupons, e.g., transfer coupons to one or more consumers (via the consumer mobile devices). Coupon server 430B manages the coupon issued by the content provider.

The consumer 'clips' the coupon, which prompts the addition of a consumer ID to the blockchain record for the coupon in coupon server 430B. The consumer may redeem the coupon at any one of multiple retailers 470 carrying the product associated with the coupon, e.g., at a retailer POS (e.g., POS 170). In some embodiments, retail integrator 475 hosts an API application installed in a POS device at the retailer (e.g., POS device 110-3), and handles the dissemination of coupon related metadata such as the offer barcode when the consumer requests to redeem the coupon. Retail integrator 475 communicates the coupon information and the redeem request from the consumer to coupon server 430B. Coupon server 430B then verifies and authorizes the coupon redemption (or not). In some embodiments, a clearing house 431B communicates with a cloud reporting server 430A to coordinate retail integrator 475 and content providers 435, linking brand manufacturers 420 with retailers 470 selling the products provided by brand manufacturers 420.

Figure 5:
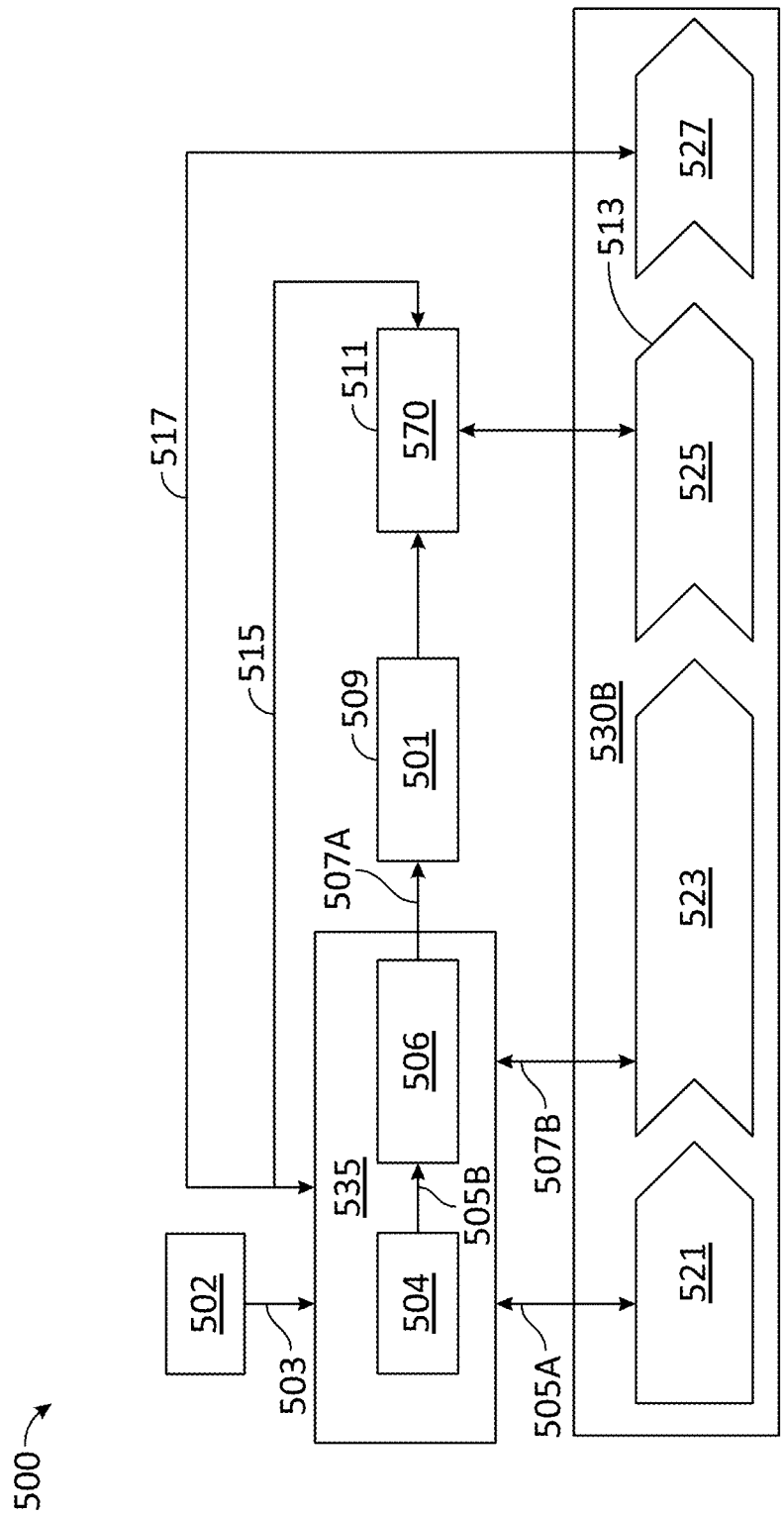
FIG. 5 illustrates a block diagram including hardware and steps in a coupon life cycle, according to some embodiments.

FIG. 5 illustrates a block diagram 500 including hardware and steps in a coupon life cycle, according to some embodiments. The hardware includes a publisher 535 and a blockchain host 530B interacting to form a blockchain for a coupon transaction (e.g., a certificate or voucher), according to some embodiments. A CPG manufacturer 502 provides a coupon to the publisher (step 503). CPG manufacturer 502 may be interested in an advertising campaign to push a new product into the market, and thus it collaborates with publisher 535 to get coupons out to a consumer 501. Publisher 535 may include a provider 504 and a distributor 506. Publisher 535 requests blockchain host 530B to create a first block 521 with coupon data (step 505A). The coupon data may include campaign dates, redemption rules, and a serial number for each of a number of coupons that CPG manufacturer 502 may decide to issue. In some embodiments, CPG manufacturer 502 provides a unique serial number to each coupon in step 503, securely linking CPG manufacturer 502 with the coupon. Thus, CPG manufacturer 502 may be protected from coupon fraud.

Blockchain host 530B then creates an offer block and informs publisher 535. Publisher 535 distributes the coupon to one or more consumers 501 via a distributor 506 (step 505B). In some embodiments, publisher 535 may request blockchain host 530B to add an offer block indicating that the coupon has been submitted to consumer 501, in step 505B. In some embodiments, the offer block may include the IDs of consumers 501 to which the coupon has been sent. Consumer 501 receives the coupon (step 507A).

When the coupon is clipped or printed to consumer 501, publisher 535 assigns a public address to the coupon (step 507B). The public address may include an image, barcode, or QR code in a mobile device, and is publicly viewable in the blockchain record. Blockchain host 530B creates a clip block 523 in the blockchain record and informs publisher 535. Blockchain host 530B hashes the public address and creates a private key to access the blockchain record. Publisher 535 then provides the private key to consumer 501.

When consumer 501 redeems the coupon (step 509) at a retailer 570, retailer 570 validates the coupon, accessing the blockchain record (step 511), by providing the private key through a POS device. Retailer 570 uses the private key to unlock the public address and validate the coupon data in the blockchain record (step 513). Blockchain host 530B prevents fraud for retailer 570 by verifying the coupon data with the associated blockchain record, using consensus of multiple parties. Thus, blockchain host 530B can help retailer 570 quickly establish that a coupon can be trusted. Blockchain host 530B handles redemption rules for the coupons. Accordingly, access or redemption of the coupon is provided through the private key, in the absence of which a coupon cannot be redeemed. When the credentials for the coupon presented to blockchain host 530B are legitimate and the redemption rules are met, blockchain host 530B adds a redeem block 525 with a new address and a new private key to the blockchain network and provides the new private key to retailer 570. Retailer then applies the redemption and submits a redemption confirmation to publisher 535 (step 515), including the new private key. Publisher 535 validates the redemption transaction using the new private key to access the blockchain record and requesting blockchain host 530B to add a clear block 527 to the blockchain record (step 517). In some embodiments, the clear block includes information clearing the coupon to avoid a second use, and includes a record of the redeem transaction. The entire blockchain record, thus completed, may be stored in a database, for a later audit.

Figure 6:
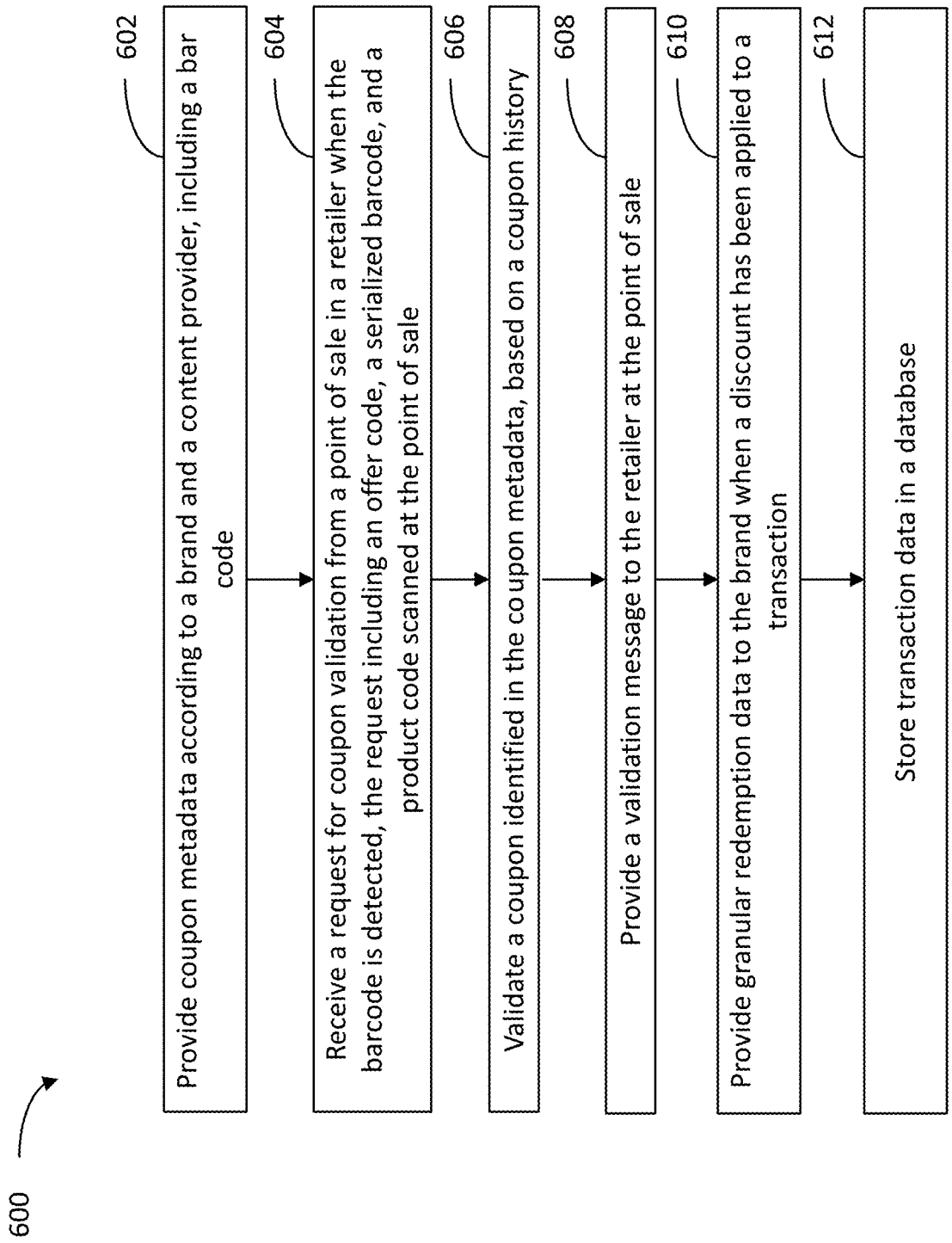
FIG. 6 illustrates steps in a method for validating a coupon, certificate, or voucher, according to some embodiments.

FIG. 6 illustrates steps in a method 600 for validating a coupon, certificate, or voucher, according to some embodiments. Method 600 may be performed at least partially by any one of the plurality of servers illustrated in FIG. 1. For example, at least some of the steps in method 600 may be performed by one component in a mobile device running code for an application to access a promotion provided by a first server, or a component in the first server or a second server (e.g., servers 130A and 130B, respectively). The second server may include a blockchain host configured to create a blockchain associated with the promotion transaction, upon request from the first server (e.g., server 130B, coupon server 430B, and blockchain host 530B). Accordingly, at least some of the steps in method 600 may be performed by a processor executing commands stored in a memory of one or more servers or the mobile device, or accessible by the server or the mobile device (e.g., processors 212 and memories 220). Further, in some embodiments, at least some of the steps in method 600 may be performed overlapping in time, almost simultaneously, or in a different order from the order illustrated in method 600. Moreover, a method consistent with some embodiments disclosed herein may include at least one, but not all, of the steps in method 600.

Step 602 includes providing coupon metadata (e.g., value, code qualifier) according to a brand and a content provider, including a bar code. In some embodiments, step 602 includes requesting the blockchain host to start a blockchain including the coupon offer and the coupon metadata. In some embodiments, step 602 further includes requesting the blockchain host to add a block in the blockchain, the block including a consumer ID for the consumer that has received the coupon metadata.

Step 604 includes receiving a request for coupon validation from a point of sale in a retailer when the first and second barcodes are detected, the request including an offer code, a serialized barcode, and a product code scanned at the point of sale. In some embodiments, step 604 includes transmitting the request to the blockchain host.

Step 606 includes validating the coupon based on a coupon history (e.g., whether the coupon has or has not been used). In some embodiments, step 606 includes requesting the blockchain host to match the consumer ID and other data from the point of sale with the coupon blockchain.

Step 608 includes providing a validation message to the retailer at the point of sale.

Step 610 includes providing granular redemption data to the brand when a discount has been applied to the transaction.

Step 612 includes storing the transaction data in a database. In some embodiments, step 612 includes auditing the transaction based on the stored data. In some embodiments, step 612 includes requesting the blockchain host to include a redeem block in the coupon blockchain.

Figure 7:
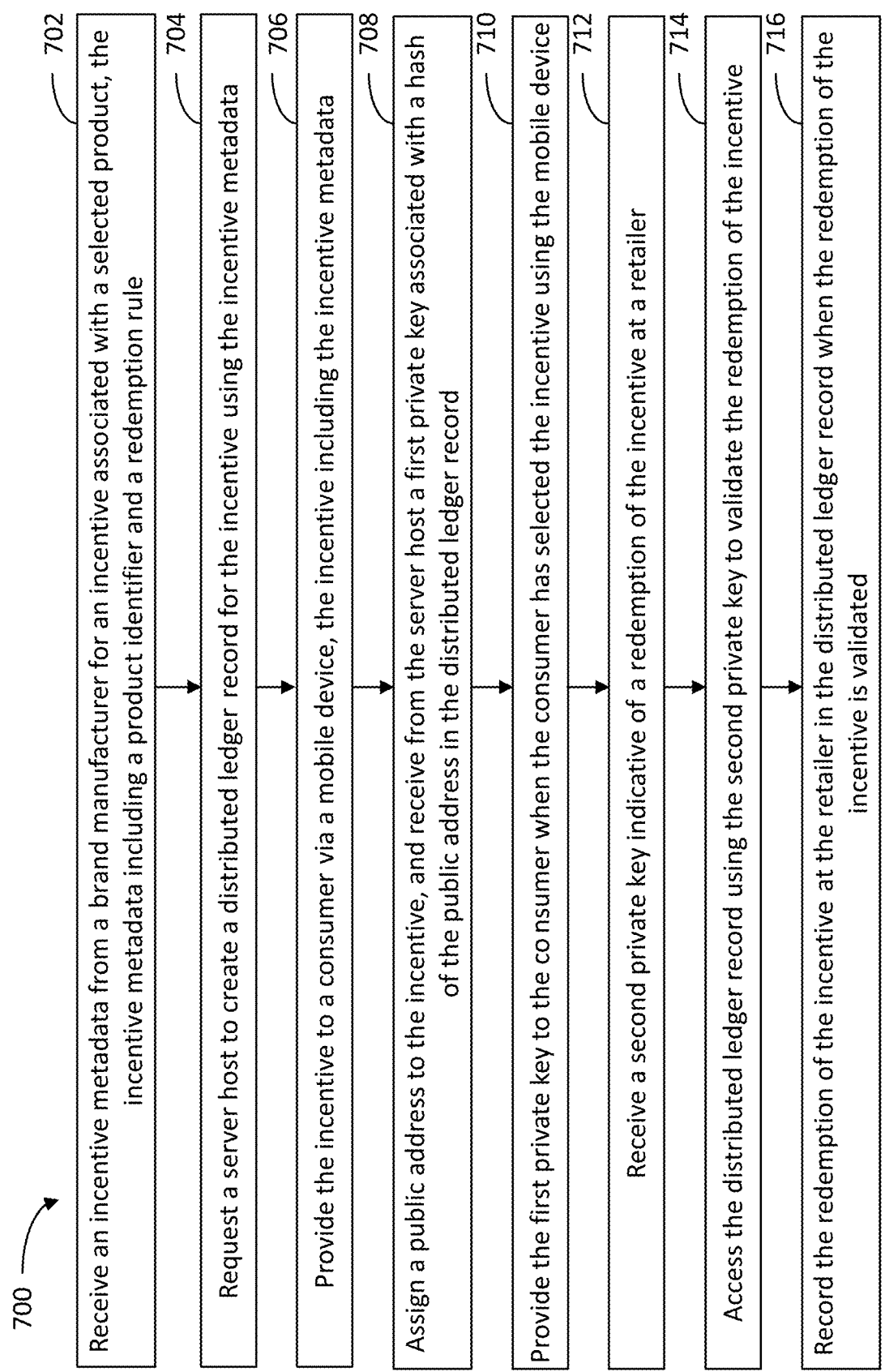
FIG. 7 illustrates steps in a method for validating a coupon, certificate, or voucher, according to some embodiments.

FIG. 7 illustrates steps in a method 700 for validating a coupon, certificate, or voucher, according to some embodiments. In some embodiments, the coupon, certificate or voucher may be generically referred to as an "incentive." Method 700 may be performed at least partially by any one of the plurality of servers illustrated in FIG. 1. For example, at least some of the steps in method 700 may be performed by one component in a mobile device running code for an application to access a promotion provided by a first server, or a component in the first server or a second server (e.g., servers 130A and 130B, respectively). The second server may include a server host configured to create a distributed ledger associated with the promotion transaction, upon request from the first server (e.g., server 130B, coupon server 430B, and blockchain host 530B). In some embodiments, a server as disclosed herein may be configured as a blockchain host, to host a distributed ledger (e.g., a blockchain) record. That users can access having the appropriate certificates, and wherein any changes or updates are recorded in full visibility of all authorized users. Accordingly, at least some of the steps in method 700 may be performed by a processor executing commands stored in a memory of one or more servers or the mobile device, or accessible by the server or the mobile device (e.g., processors 212 and memories 220). Further, in some embodiments, at least some of the steps in method 700 may be performed overlapping in time, almost simultaneously, or in a different order from the order illustrated in method 700. Moreover, a method consistent with some embodiments disclosed herein may include at least one, but not all, of the steps in method 700.

Step 702 includes receiving incentive metadata from a brand manufacturer for an incentive associated with a selected product, the incentive metadata including a product identifier and a redemption rule. In some embodiments, step 702 includes requesting, to a server host, to include an offer block in the distributed ledger record associated with the incentive. In some embodiments, step 702 includes requesting, to the server host, to include an offer block in the distributed ledger record associated with the incentive.

Step 704 includes requesting a server host to create a distributed ledger record for the incentive using the incentive metadata. In some embodiments, step 704 includes requesting, to a server host, to include a clip block in the distributed ledger record associated with the incentive, when the consumer has clipped an incentive offer to use the incentive.

Step 706 includes providing the incentive to a consumer via a mobile device, the incentive including the incentive metadata. In some embodiments, the incentive metadata includes an offer code, a serialized barcode, and a product code, and step 706 includes receiving the incentive metadata after the point of sale device scans the consumer mobile device at the point of sale. In some embodiments, step 706 includes adding a barcode to identify the consumer in the incentive metadata.

Step 708 includes assigning a public address to the incentive, and receiving from the server host a first private key associated with a hash of the public address in the distributed ledger record. In some embodiments, the hash encrypts an incentive history in the distributed ledger record, and step 708 includes re-hashing the incentive metadata to match the distributed ledger record.

Step 710 includes providing the first private key to the consumer when the consumer has selected the incentive using the mobile device. In some embodiments, step 710 includes storing a purchase transaction data of the selected product in a database. In some embodiments, step 710 includes requesting, to the server host, to include a block in the distributed ledger record associated with the incentive, when the consumer has clipped an incentive offer to use the incentive.

Step 712 includes receiving a second private key indicative of a redemption of the incentive at a retailer. In some embodiments, step 712 occurs upon a request by the consumer for validating the incentive at a point of sale in a retailer store, the request by the consumer including the first private key. In some embodiments, step 712 occurs when the retailer verifies that the redemption rule is met, assigns a new address to the distributed ledger record, requests the second private key from the server host, and adds the redemption of the incentive to the distributed ledger record.

Step 714 includes accessing the distributed ledger record using the second private key to validate the redemption of the incentive. In some embodiments, step 714 includes requesting, to a server host, to include a redeem block in the distributed ledger record associated with the incentive, when validating the incentive is successful.

Step 716 includes recording the redemption of the incentive at a retailer in the distributed ledger record when the redemption of the incentive is validated. In some embodiments, step 716 includes requesting, to the server host, to include a clear block in the distributed ledger record associated with the incentive, when the redemption of the incentive is successful. In some embodiments, step 716 includes providing a granular redemption data to the brand manufacturer when a discount has been applied to a purchase transaction of the selected product at the retailer.

Figure 8:
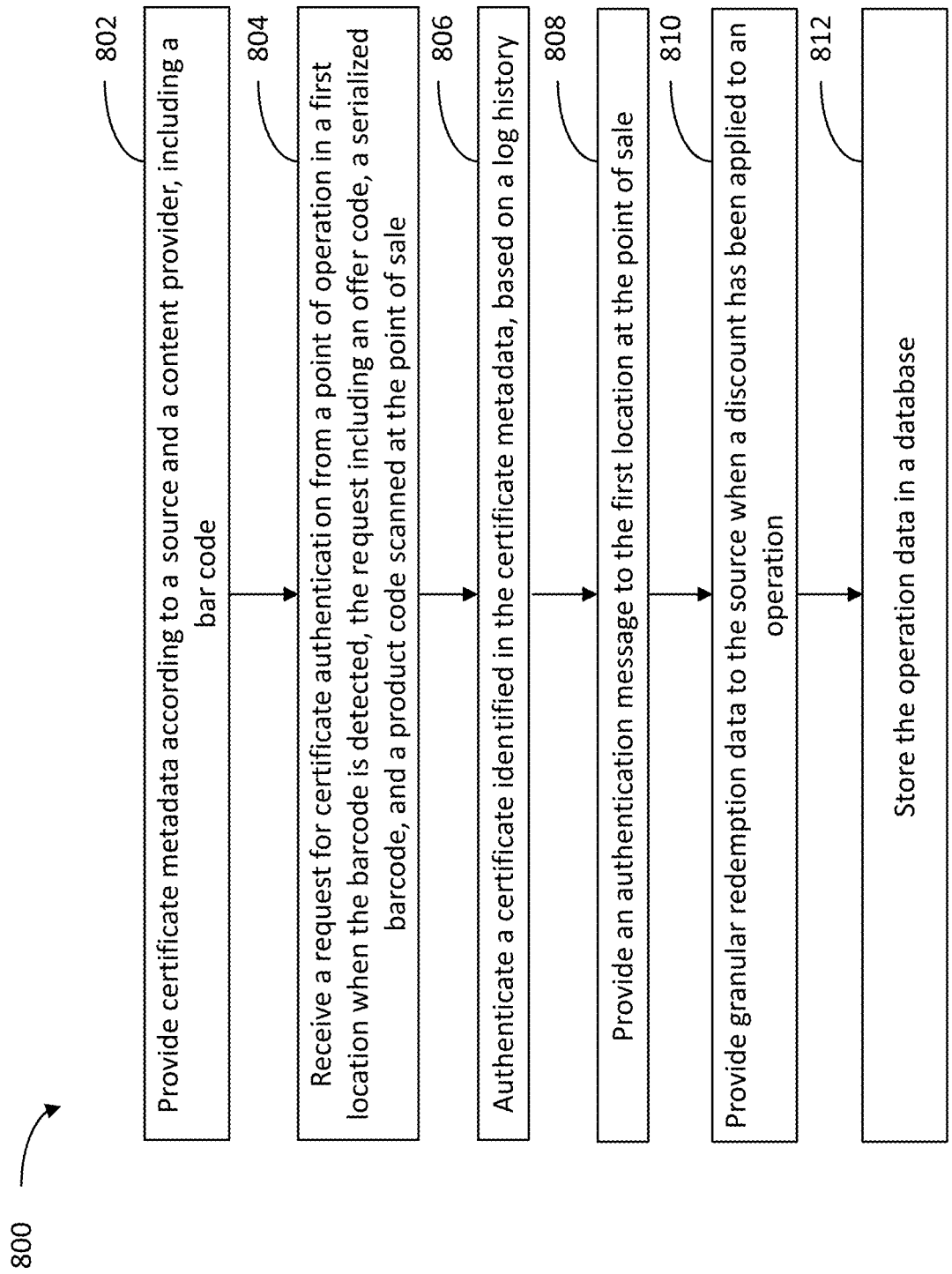
FIG. 8 illustrates steps in a method for authenticating a certificate, according to some embodiments.

FIG. 8 illustrates steps in a method 800 for authenticating a certificate, according to some embodiments. Method 800 may be performed at least partially by any one of the plurality of servers illustrated in FIG. 1. For example, at least some of the steps in method 800 may be performed by one component in a mobile device running code for an application to access a promotion provided by a first server, or a component in the first server or a second server (e.g., servers 130A and 130B, respectively). The second server may include a blockchain host configured to create a blockchain associated with the promotion transaction, upon request from the first server (e.g., server 130B, coupon server 430B, and blockchain host 530B). Accordingly, at least some of the steps in method 800 may be performed by a processor executing commands stored in a memory of one or more servers or the mobile device, or accessible by the server or the mobile device (e.g., processors 212 and memories 220). Further, in some embodiments, at least some of the steps in method 800 may be performed overlapping in time, almost simultaneously, or in a different order from the order illustrated in method 800. Moreover, a method consistent with some embodiments disclosed herein may include at least one, but not all, of the steps in method 800.

Step 802 includes providing a certificate metadata according to a source and a content provider, including a bar code. In some embodiments, step 802 includes providing at least one of a consumer identifier, a mobile device identifier, and the product code.

Step 804 includes receiving a request for certificate authentication from a point of operation in a first location when the bar code is detected, the request including an offer code, a serialized barcode, and a product code scanned at the point of operation.

Step 806 includes authenticating a certificate identified in the certificate metadata, based on a log history. In some embodiments, step 806 includes applying one of a business rule, an anti-stacking rule, and a gating rule to the certificate metadata in a certificate engine. In some embodiments, step 806 includes verifying a clip block associated with the certificate in a blockchain host. In some embodiments, step 806 includes verifying a consumer identification with an enrollment tool. In some embodiments, step 806 includes receiving, from a retail integrator, an identification of the first location from multiple retailers in a network, and verifying whether a second location as made a request for validating the certificate. In some embodiments, step 806 includes receiving, from the first location, an indication that the certificate violates an anti-stocking rule.

Step 808 providing an authentication message to the first location at the point of operation. In some embodiments, step 808 includes providing an encrypted key to a client device at the point of operation for access to a blockchain network, including a certificate redemption block.

Step 810 includes providing granular redemption data to the source when a discount has been applied to an operation.

Step 812 includes storing transaction data in a database. In some embodiments, step 812 further includes providing the certificate metadata to a second location when the first location is out of stock of a product identified in the certificate metadata. In some embodiments, step 812 further includes providing a command to a printer at the point of operation of the first location to print a hard copy of the certificate to a user identified in the certificate metadata.

Hardware Overview

Figure 9:
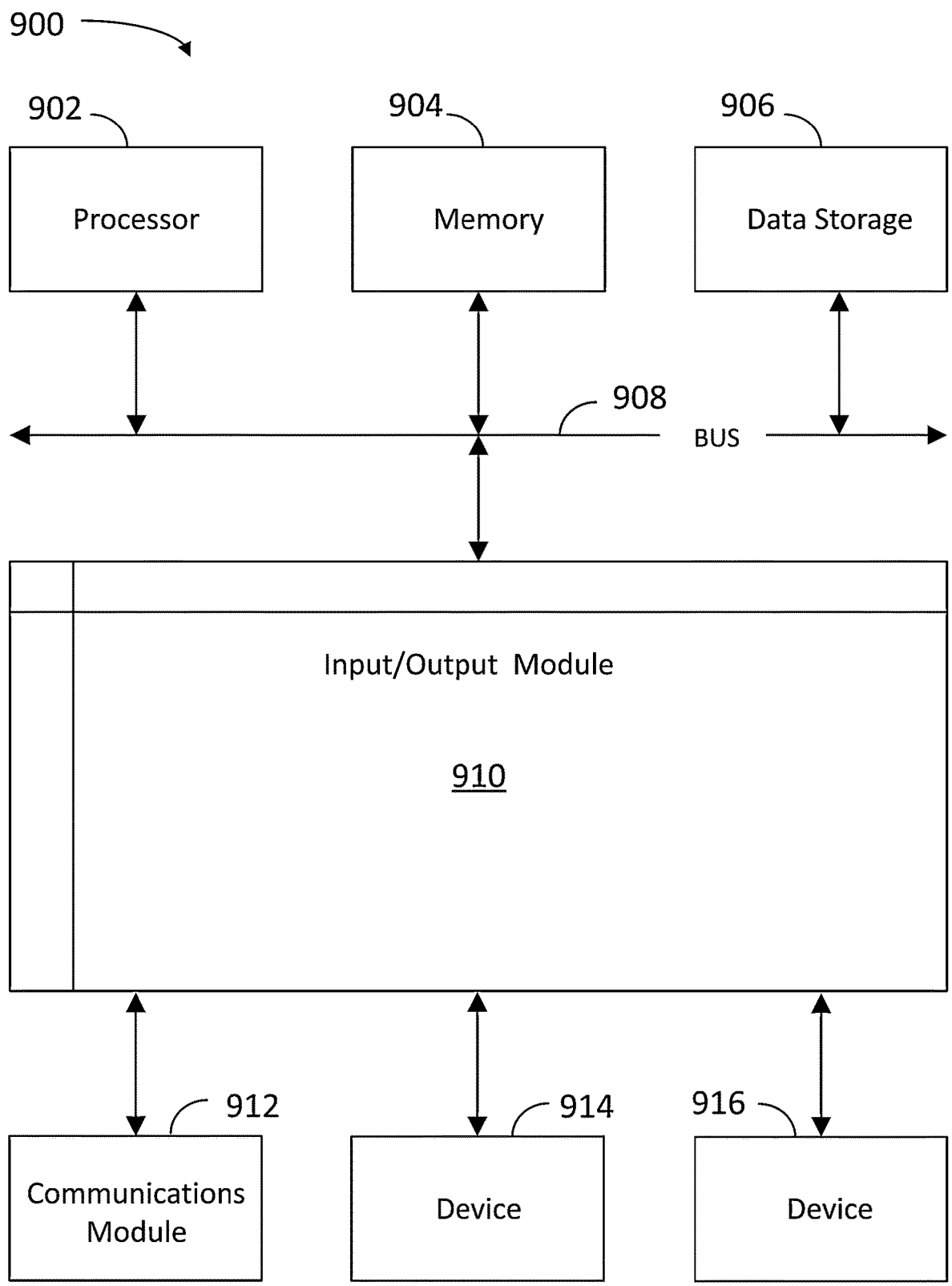
FIG. 9 illustrates a block diagram of a computer system configured to execute at least some of the methods disclosed herein, according to some embodiments.

FIG. 9 is a block diagram illustrating an example computer system 900 with which the client and network device of FIG. 1 and the methods of FIGS. 3-7 can be implemented. In certain aspects, computer system 900 may be implemented using hardware or a combination of software and hardware, either in a dedicated network device, or integrated into another entity, or distributed across multiple entities.

Computer system 900 (e.g., client devices 110 and 210, and servers 130 and 230) includes a bus 908 or other communication mechanism for communicating information, and a processor 902 (e.g., processors 212) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program consumer products, e.g., one or more modules of computer program instructions encoded on a computer-readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218) include networking interface cards, such as Ethernet cards and modems. In certain aspects, input/output module 910 is configured to connect to a plurality of devices, such as an input device 914 (e.g., input device 114) and/or an output device 916 (e.g., output device 116). Exemplary input devices 914 include a keyboard and a pointing device, e.g., a mouse or a trackball, by which a consumer can provide input to the computer system 900. Other kinds of input devices 914 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 916 include display devices, such as an LCD (liquid crystal display) monitor, for displaying information to the consumer.

According to one aspect of the present disclosure, the client device 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data network device, or that includes a middleware component, e.g., an application network device, or that includes a front-end component, e.g., a client computer having a graphical consumer interface or a Web browser through which a consumer can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and network devices. A client and network device are generally remote from each other and typically interact through a communication network. The relationship of client and network device arises by virtue of computer programs running on the respective computers and having a client-network device relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in either one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

RECITATION OF EMBODIMENTS

Embodiments as disclosed herein may include the following:

Embodiment I: A computer-implemented method as disclosed herein includes receiving incentive metadata from a brand manufacturer for an incentive associated with a selected product, the incentive metadata including a product identifier and a redemption rule. The computer-implemented method also includes requesting a server host to create a distributed ledger record for the incentive using the incentive metadata, providing the incentive to a consumer via a mobile device, the incentive including the incentive metadata, and assigning a public address to the incentive, and receiving from the server host a first private key associated with a hash of the public address in the distributed ledger record. The computer-implemented method also includes providing the first private key to the consumer when the consumer has selected the incentive using the mobile device, receiving a second private key indicative of a redemption of the incentive at a retailer, accessing the distributed ledger record using the second private key to validate the redemption of the incentive and recording the redemption of the incentive at a retailer in the distributed ledger record when the redemption of the incentive is validated.

Embodiment II: A system as disclosed herein includes one or more processors and a memory storing instructions. When the one or more processors execute the instructions, they cause the system to: receive incentive metadata from a brand manufacturer for an incentive associated with a selected product, the incentive metadata including a product identifier and a redemption rule. When the one or more processors execute the instructions, they also cause the system to request, to a server host, to create a distributed ledger record for the incentive using the incentive metadata, to provide the incentive to a consumer via a mobile device, the incentive including the incentive metadata, to assign a public address to the incentive, and receiving from the server host a first private key associated with a hash of the public address in the distributed ledger record, and to provide the first private key to the consumer when the consumer has selected the incentive using the mobile device. When the one or more processors execute the instructions, they also cause the system to receive a second private key indicative of a redemption of the incentive at a retailer, to access the blockchain record using the second private key to validate the redemption of the incentive, and to record the redemption of the incentive at a retailer in the blockchain record when the redemption of the incentive is validated.

Embodiment III: A computer-implemented method as disclosed herein includes providing an incentive metadata according to a brand and a content provider, including a barcode and receiving a request for incentive validation from a point of sale in a first retailer when the barcode are detected, the request including an offer code, a serialized barcode, and a product code scanned at the point of sale. The computer-implemented method also includes validating an incentive identified in the incentive metadata, based on an incentive history, providing a validation message to the first retailer at the point of sale, providing granular redemption data to the brand when a discount has been applied to a transaction, and storing a transaction data in a database.

Embodiment IV: A computer-implemented method as disclosed herein includes providing a certificate metadata according to a source and a content provider, including a bar code, and receiving a request for certificate authentication from a point of operation in a first location when the bar code are detected, the request including an offer code, a serialized bar code, and a product code scanned at the point of operation. The computer-implemented method also includes authenticating a certificate identified in the certificate metadata, based on a log history, providing an authentication message to the first location at the point of operation, providing granular redemption data to the source when a discount has been applied to an operation, and storing an operation data in a database.

Any one of embodiments I, II, III and IV may be combined with any one of the following elements, in any order and number, consistent with embodiments as disclosed herein.

Element 1, wherein receiving a second private key indicating a redemption of the incentive at a retailer occurs upon a request by the consumer for validating the incentive at a point of sale in a retailer store, the request by the consumer including the first private key. Element 2, wherein receiving a second private key indicating a redemption of the incentive at a retailer occurs when the retailer verifies that the redemption rule is met, assigns a new address to the distributed ledger record, requests the second private key from the distributed ledger host, and adds the redemption of the incentive to the distributed ledger record. Element 3, wherein providing the incentive to a consumer via a mobile device includes including a barcode to identify the consumer in the incentive metadata. Element 4, further including providing a granular redemption data to the brand manufacturer when a discount has been applied to a purchase transaction of the selected product at the retailer. Element 5, further including requesting, to the distributed ledger host, to include an offer block in the distributed ledger record associated with the incentive. Element 6, further including requesting, to the distributed ledger host, to include a clear block in the distributed ledger record associated with the incentive, when the redemption of the incentive is successful. Element 7, further including requesting, to the distributed ledger host, to include a block in the distributed ledger record associated with the incentive, when the consumer has clipped a incentive offer to use the incentive. Element 8, further including providing to the retailer a command to print a hard copy of the incentive in a printer at a point of sale in the retailer. Element 9, further including clearing the incentive from the distributed ledger host when the incentive is redeemed or when an error indicates an invalid transaction with the incentive.

Element 10, wherein to receive a second private key indicating a redemption of the incentive at a retailer the one or more processors execute instructions to validate the incentive at a point of sale in a retailer store, with the first private key. Element 11, wherein to receive a second private key indicating a redemption of the incentive at a retailer the one or more processors execute instructions to verify that the redemption rule is met, to assign a new address to the distributed ledger record, to request the second private key from the distributed ledger host, and to request the distributed ledger host to include the redemption of the incentive to the distributed ledger record. Element 12, wherein to provide the incentive to a consumer via a mobile device the one or more processors execute instructions to include a barcode to identify the consumer in the incentive metadata. Element 13, wherein the one or more processors further execute instructions to provide a granular redemption data to the brand manufacturer when a discount has been applied to a purchase transaction of the selected product at the retailer. Element 14, wherein the one or more processors further execute instructions to request, to the distributed ledger host, to include an offer block in the distributed ledger record associated with the incentive. Element 15, wherein the one or more processors further execute instructions to request, to the distributed ledger host, to include a clear block in the distributed ledger record associated with the incentive, when the redemption of the incentive is successful. Element 16, wherein the one or more processors further execute instructions to request, to the distributed ledger host, to include a block in the distributed ledger record associated with the incentive, when the consumer has clipped a incentive offer to use the incentive. Element 17, wherein the one or more processors further execute instructions to including providing to the retailer a command to print a hard copy of the incentive in a printer at a point of sale in the retailer. Element 18, wherein the one or more processors further execute instructions to clear the incentive from the distributed ledger host when the incentive is redeemed or when an error indicates an invalid transaction with the incentive.

Element 19, wherein providing a incentive metadata includes providing at least one of a consumer identifier, a mobile device identifier, and the product code. Element 20, wherein validating the incentive based on a incentive history includes applying one of a business rule, an anti-stacking rule, and a gating rule to the incentive metadata in a certificate engine. Element 21, wherein validating the incentive based on a incentive history includes verifying a clip block associated with the incentive in a distributed ledger host. Element 22, wherein validating the incentive based on a incentive history includes verifying a consumer identification with an enrollment tool. Element 23, wherein validating the incentive based on a incentive history includes receiving, from a retail integrator, an identification of the first retailer from multiple retailers in a network, and verifying whether a second retailer as made a request for validating the incentive. Element 24, wherein validating the incentive based on a incentive history including receiving, from the first retailer, an indication that the incentive violates an anti-stocking rule. Element 25, further including providing the incentive metadata to a second retailer when the first retailer is out of stock of a product identified in the incentive metadata. Element 26, wherein providing a validation message to the first retailer at the point of sale includes providing an encrypted key to a client device at the point of sale for access to a distributed ledger network including a incentive redemption block. Element 27, further includes providing a command to a printer at the point of sale of the first retailer to print a hard copy of the incentive to a consumer identified in the incentive metadata.

Element 28, wherein providing a certificate metadata includes providing at least one of a consumer identifier, a mobile device identifier, and the product code. Element 29, wherein authenticating the certificate based on a incentive history includes applying one of a business rule, an anti-stacking rule, and a gating rule to the certificate metadata in a certificate engine. Element 30, wherein authenticating the certificate based on a incentive history includes verifying a clip block associated with the certificate in a distributed ledger host. Element 31, wherein authenticating the certificate based on a certificate history includes verifying a consumer identification with an enrollment tool. Element 32, wherein authenticating the certificate based on a certificate history includes receiving, from a retail integrator, an identification of the first location from multiple retailers in a network, and verifying whether a second location as made a request for validating the certificate. Element 33, wherein authenticating the certificate based on a certificate history includes receiving, from the first location, an indication that the certificate violates an anti-stocking rule. Element 34, wherein providing an authentication message to the first location at the point of operation includes providing an encrypted key to a client device at the point of operation for access to a distributed ledger network including a certificate redemption block. Element 35, further including providing the certificate metadata to a second location when the first location is out of stock of a product identified in the certificate metadata. Element 36, further includes providing a command to a printer at the point of operation of the first location to print a hard copy of the certificate to a user identified in the certificate metadata.

What is claimed is:

1. A computer-implemented method, comprising:
   receiving an incentive metadata from a brand manufacturer for an incentive associated with a selected product, the incentive metadata including a product identifier and a redemption rule;
   requesting a distributed ledger host to create a distributed ledger record for the incentive using the incentive metadata, wherein the distributed ledger record comprises a blockchain;
   determining, via a gating rule, the incentive is allowable;
   in response to determining, via the gating rule, the incentive is allowable, providing a message to the blockchain that the incentive is redeemable;
   verifying, in the incentive, an anti-stacking rule against combining multiple incentives for a same product and at a same time;
   providing the incentive to a consumer via a mobile device, the incentive including the incentive metadata;
   assigning a public address to the distributed ledger record for the incentive;
   generating a visual code for the public address;
   providing the visual code to the mobile device for display in a graphic user interface at a point of sale of a retailer;
   generating, by the distributed ledger host, a first private key associated with a hash of the public address;
   providing, by the distributed ledger host, the first private key to the mobile device in response to the consumer selecting the incentive using the mobile device;
   receiving, from the consumer and by the point of sale in the retailer, a request by the consumer for redeeming the incentive, the request by the consumer including the first private key from the mobile device and the public address from the visual code from the mobile device;
   redeeming the incentive at the point of sale in the retailer, which comprises:
      accessing the distributed ledger record using the public address from the visual code and the first private key;
      verifying, by the distributed ledger host, that the redemption rule is met;
      assigning, by the distributed ledger host, a new address to the distributed ledger record;
      generating, by the distributed ledger host, a second private key;
      adding, by the distributed ledger host, a redemption of the incentive to the distributed ledger record;
      transmitting, by the distributed ledger host, the second private key to the point of sale in the retailer; and
      applying, by the point of sale in the retailer, the redemption of the incentive; and
   validating redemption of the incentive based on a submitted redemption confirmation, which comprises:
      accessing the distributed ledger record using the second private key; and
      adding, by the distributed ledger host, a further recording of the redemption of the incentive at the retailer in the distributed ledger record.

2. The computer-implemented method of claim 1, wherein providing the incentive to a consumer via a mobile device comprises including a barcode to identify the consumer in the incentive metadata.

3. The computer-implemented method of claim 1, further comprising providing a granular redemption data to the brand manufacturer wherein a discount has been applied to a purchase transaction of the selected product at the retailer.

4. The computer-implemented method of claim 1, further comprising requesting, to the distributed ledger host, to include an offer block in the distributed ledger record associated with the incentive.

5. The computer-implemented method of claim 1, further comprising requesting, to the distributed ledger host, to include a clear block in the distributed ledger record associated with the incentive in response to a validation of the incentive.

6. The computer-implemented method of claim 1, further comprising requesting, to the distributed ledger host, to include a block in the distributed ledger record associated with the incentive, wherein the consumer has clipped an incentive offer to use the incentive.

7. The computer-implemented method of claim 1, further comprising providing to the retailer a command to print a hard copy of the incentive in a printer at a point of sale in the retailer.

8. A system, comprising:
   one or more processors; and
   a memory storing multiple instructions which, wherein executed by the one or more processors, cause the system to:
      receive an incentive metadata from a brand manufacturer for an incentive associated with a selected product, the incentive metadata including a product identifier and a redemption rule;
      request, to a distributed ledger host, to create a distributed ledger record for the incentive using the incentive metadata, wherein the distributed ledger record comprises a blockchain;
      determine, via a gating rule, the incentive is allowable;

in response to determining, via the gating rule, the incentive is allowable, provide a message to the blockchain that the incentive is redeemable;

verify, in the incentive, an anti-stacking rule against combining multiple incentives for a same product and at a same time;

provide the incentive to a consumer via a mobile device, the incentive including the incentive metadata;

assign a public address to the distributed ledger record for the incentive;

generate a visual code for the public address;

provide the visual code to the mobile device for display in a graphic user interface at a point of sale of a retailer;

generate a first private key associated with a hash of the public address;

provide the first private key to the mobile device in response to the consumer selecting the incentive using the mobile device;

receive, from the consumer and by the point of sale in the retailer, a request by the consumer for redeeming the incentive, the request by the consumer including the first private key from the mobile device and the public address from the visual code from the mobile device;

redeem the incentive at the point of sale in the retailer, which comprises:
   accessing the distributed ledger record using the public address from the visual code and the first private key;
   verifying that the redemption rule is met;
   assigning a new address to the distributed ledger record;
   generating a second private key;
   adding a redemption of the incentive to the distributed ledger record;
   transmitting the second private key to the point of sale in the retailer, and
   applying the redemption of the incentive; and validate redemption of the incentive based on a submitted redemption confirmation, which comprises:
   accessing the distributed ledger record using the second private key; and
   adding a further recording of the redemption of the incentive at the retailer in the distributed ledger record.

9. The system of claim 8, wherein the instructions executed by the one or more processors further cause the system to include a barcode to identify the consumer in the incentive metadata.

10. The system of claim 8, wherein the instructions executed by the one or more processors further cause the system to provide a granular redemption data to the brand manufacturer wherein a discount has been applied to a purchase transaction of the selected product at the retailer.

11. The system of claim 8, wherein the instructions executed by the one or more processors further cause the system to request, to the distributed ledger host, to include an offer block in the distributed ledger record associated with the incentive.

12. The system of claim 8, wherein the instructions executed by the one or more processors further cause the system to request, to the distributed ledger host, to include a clear block in the distributed ledger record associated with the incentive after the validation of the incentive.

13. The system of claim 8, wherein the instructions executed by the one or more processors further cause the system to request, to the distributed ledger host, to include a block in the distributed ledger record associated with the incentive, wherein the consumer has clipped an incentive offer to use the incentive.

14. The system of claim 8, wherein the instructions executed by the one or more processors further cause the system to provide, to the retailer a command to print a hard copy of the incentive in a printer at a point of sale in the retailer.

* * * * *